United States Patent
Reny

(10) Patent No.: US 11,017,189 B2
(45) Date of Patent: May 25, 2021

(54) SEE ID SYSTEM

(71) Applicant: William T. Reny, Nampa, ID (US)

(72) Inventor: William T. Reny, Nampa, ID (US)

(73) Assignee: SEE ID, INC, Nampa, ID (US)

( * ) Notice: Subject to any disclaimer, the term of this patent is extended or adjusted under 35 U.S.C. 154(b) by 0 days.

(21) Appl. No.: 16/157,923

(22) Filed: Oct. 11, 2018

(65) Prior Publication Data

US 2019/0108374 A1   Apr. 11, 2019

Related U.S. Application Data

(60) Provisional application No. 62/570,723, filed on Oct. 11, 2017.

(51) Int. Cl.

| | |
|---|---|
| *G06K 7/10* | (2006.01) |
| *G01S 1/00* | (2006.01) |
| *H04W 4/44* | (2018.01) |
| *H04W 4/80* | (2018.01) |
| *H04W 4/02* | (2018.01) |
| *G01S 17/86* | (2020.01) |
| *G01S 17/931* | (2020.01) |

(52) U.S. Cl.
CPC ............ *G06K 7/10376* (2013.01); *G01S 1/00* (2013.01); *G01S 17/86* (2020.01); *G01S 17/931* (2020.01); *H04W 4/02* (2013.01); *H04W 4/44* (2018.02); *H04W 4/80* (2018.02)

(58) Field of Classification Search
None
See application file for complete search history.

(56) References Cited

U.S. PATENT DOCUMENTS

| 2008/0162036 A1* | 7/2008 | Breed | G08G 1/161 |
| | | | 701/408 |
| 2015/0149837 A1* | 5/2015 | Alonso | G06K 7/10227 |
| | | | 714/57 |
| 2015/0161872 A1* | 6/2015 | Beaulieu | B66C 13/40 |
| | | | 340/686.6 |

\* cited by examiner

*Primary Examiner* — Daniell L Negron
(74) *Attorney, Agent, or Firm* — Scott D. Swanson; Shaver & Swanson, LLP

(57) ABSTRACT

One of the major issues with adding a driverless vehicle to a roadway, populated or not, is how that vehicle is able to keep its location in the required lane of the roadway in which it is operating. Current GPS systems that provide information to autonomous vehicles are not accurate enough for those vehicles to keep their operating positions in a lane on roadways. In inclement weather the GPS system is even less accurate and may not even function. In alternate embodiments the system can be utilized for equipment and personnel identification, such as identifying the location of construction workers and equipment at a construction site in relation to the system. This will provide benefits including, but not limited to, increasing the safety of a construction site, ensuring that only authorized personnel are present on the site and/or within a given area of the site.

9 Claims, No Drawings

SEE ID SYSTEM

PRIORITY/CROSS-REFERENCE TO RELATED APPLICATIONS

This application claims the benefit of U.S. Provisional Application No. 62/570,723, filed Oct. 11, 2017, the disclosure of which is incorporated by reference.

FIELD OF THE INVENTION

The disclosure generally relates to the field of object location identification, including identification of vehicle location, the identification of persons relative to the system, and other objects in relation to the system. Particular embodiments relate to utilization of one or more SEE ID RFID Readers that are vehicle mounted to locate SEE ID roadway RFID tags in a series. In a preferred embodiment multiple SEE ID RFID modules that are vehicle mounted have the ability to read SEE ID RFID roadway tags in order for a sensor on the vehicle to sense the SEE ID RFID road tags and allow for a SEE ID RFID vehicle mounted processor to determine the precise location of the vehicle in relation to the roadway. Alternative embodiments utilize the system for safety and/or identification to identify objects, including vehicles, persons, traffic lights, inventory in a warehouse, or other materials in relation to the system.

The SEE ID roadway system can overcome the inaccuracy of a satellite based GPS system by giving the equipped vehicle the ability to calculate its position, to the millimeter, through SEE ID roadway markers with internal SEE ID RFID tags. These SEE ID RFID tags contain information the vehicle mounted reader can be used to calculate position, including but not limited to the utilization of multiple marker triangulation. The four major components of the SEE ID system are as follows; the SEE ID roadway mounted SEE ID RFID tag with LIDAR identifier markings (SRRM), the SEE ID vehicle mounted system, the SEE ID SRRM roadway installer, and the SEE ID database that securely retains information.

DETAILED DESCRIPTION OF THE EXEMPLARY EMBODIMENTS

While the presently disclosed inventive concept(s) is susceptible of various modifications and alternative constructions, certain embodiments thereof have been described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

The difficulty with driverless vehicles navigating current roadways is the knowledge of current and future locations. GPS systems that use satellites for triangulation of position are not accurate enough (plus or minus 4 feet) to be able to provide the information needed for a vehicle to manage its lane location, manage the roadway location ahead, and keep that vehicle in the required lane while moving at a manageable speed related to other traffic on the roadway. The operation of the SEE ID roadway system is to be able to provide triangulation position for the vehicle to the millimeter. Roadway lane position will also have clear definition on multilane traffic zones. Lastly, driverless vehicles that utilize the SEE ID system will be able to plan for changes in traffic regarding roadway construction, number of vehicles in the roadway, and inclement weather. The SEE ID system in a preferred embodiment is a three part system that has a specifically marked roadway marker with a passive and/or active SEE ID RFID written once read many times (WORM) tag (SRRM), a SEE ID vehicle installer reader using RFID frequencies to gather data from SRRMs with a possible secondary subsystem LIDAR (light detecting and ranging) that calculates current vehicle position, and a SEE ID SRRM installer that uses a known measured location to accurately program SRRMs in a known position to a roadway.

The SEE ID operation process beginning with the SEE ID reader module powering on with the use of available power source from the vehicle, 12 volt DC is currently preferred and vehicle ground, then sending a signal via connected wifi, 3G, 4G or LTE communication system validating with the SEE ID database that the reader has permission to use the information programmed into the SRRMs. An affirmative confirmation communication from the database to the SEE ID reader module starts reader system operation and calibration. Indication of allowed usage will be sent to passenger or possible operator (in vehicle or to remote location) through green SEE ID indicator light. As the vehicle moves about the roadway with installed SRRMs, the reader sends out a signal to four vehicle mounted RFID sensors, powered by the SEE ID reader via a 5 volt power wire, a 5 volt digital signal wire (that sends and receives information from the reader to sensor and back), and ground wire, using secured broadcast wavelength radio frequency that powers up the passive RFID in the SRRMs.

The powered up SRRMs return prior programmed information that the reader uses to triangulate the current location and position of vehicles from three SRRMs installed on the traffic-way that have been read by the sensors mounted on the moving or stationary vehicle. The backup up system installed in the SEE ID system are four vehicle mounted LIDAR sensors; using a 5 volt power wire 5 volt digital communications wire and vehicle ground wire, reading the position of the SRRMs to calculate and calibrate vehicle position by the SEE ID reader module. SEE ID reader module will also gather necessary information from the vehicle communication network it is installed on, including but not limited to: vehicle speed, vehicle type via VIN verification, abs (anti-lock brakes) operation, range capability and load, which will happen over the current communications system dictated by the Federal Clean Air Act applicable to vehicle model year and State sold in. The collected information from the vehicle will be calculated to provide information to driverless vehicle systems in real time to change or correct position in lane as needed for any changes in roadway direction, roadway congestion and control vehicle operation. The mounting of the SRRMs to the roadway is completed by the SEE ID SRRM roadway installer which has a multi-step operation. In order to complete the task of programming required SRRM tag information, it will know the exact position of placement of SRRM with a plus or minus of accuracy of 0.5 millimeters, programs the SRRM RFID tag before it is placed in required location, transmits programmed SRRM tag to SRRM Database, and lastly adheres the SRRM to the roadway with an approved adhesive in required location that will allow for clear SEE ID reader communications and visibility. This system can also be used with a processor capable of notifying traffic authorities via an external or integrated transmitter or transceiver as to the condition of traffic on the roadway.

In a preferred embodiment the system functions to send out an RFID signal. The signal reaches a tag or other beacon which can be either a passive tag or an active tag. In a preferred embodiment the system utilizes largely passive tags to alleviate the need for a power source installed on the tag. For example, tags or other passive devices can be provided to workers in a construction zone. These tags can delineate, for example, the identity of the worker, the location at which the worker is delegated to be in, or other identifying features. The tag can include a passive RFID tag that is configured to harvest an interrogating radio wave signal disseminated from the construction vehicle. When the RFID tag of the construction worker receives the signal, the tag "wakes up" and emanates an identifying signal. Sensors on the construction vehicle then can determine the location of the employee and any other identifying information that is emanated from the tag or beacon on the construction worker's tag. In further embodiments beacons can be pre-programmed with a latitude and longitude identification to identify obstacles, locations, or other points of reference within the construction site to provide information back to the construction vehicle, or other vehicle or system, on the site. Multiple readers can be in communication via a wireless system, network, or wired system in order to detail information about mobile personnel beacons that have been detected by each system. Similarly the readers can be in communication with a primary system which compiles information from multiple readers to provide an overlay of a larger area. These readers can be mounted to a vehicle as discussed herein in relation to vehicles or can be static in a system.

Similarly general tags can be provided in consumer goods such as cellular telephones to provide location awareness to SEE ID systems to increase the safety of the general public. It is currently thought that 95% of the general public utilizes cellular phones. Installing an identifying RFID tag in each cellular phone that is produced would provide the ability of the SEE ID system to monitor the relative location of people carrying such a device. Similarly tags can be installed on animal collars, in livestock tags, child strollers, bicycles or other object. This will allow a vehicle equipped with the SEE ID system to register the locations of any of these objects.

Further benefits include the ability to easily change the identification beacon of an object. For example, if a road is under construction a beacon can be temporarily placed to respond to a vehicle driving system the identification of a road construction zone and speed limit variation. Construction zones change daily, beacon technology that the SEE ID System offers, allows for immediate update of changes to vehicle driving systems.

This will allow for improving worker safety with worker identification and location to smart vehicle. Intelligent warning/speed signs for instant modification can be utilized —speed limit changes such as entering a school zone or construction zone, changes made overnight, and rerouting of traffic can be utilized. The location of urban obstacles—bridge pillars, safety barriers, route changes, accident notifications can be utilized. The system can further be used for identification.

In a preferred embodiment the system emits a 740-760 MHz RF energy signal. This allows for a passive tag to harvest the energy from the signal and emit back a 5.9 Ghz signal. This system can be implemented in vehicles as they are manufactured or as post manufacture additions. The system can further be utilized to provide cryptographically secure tokens at key points of interest for public ledger transactions (such as deliveries, pickup, parking, tolls, or other identification facilitative situations).

General Technology:

Active Beacons: Complex devices such as traffic lights or crossing barriers can have powered transceivers embedded in them to communicate with connected vehicles. The current standards for 5G, V2X and DSRC contemplate this already and embedded boards are becoming available (including from SEE-ID) to enable smart infrastructure in these applications.

Passive Modulation: A structure with two antennas, one to harvest RF energy and the other to modulate the high frequency carrier, can be manufactured/embedded at a low cost and deployed on many temporary or remote items where power is not available. Roadway markers, street signs, pylons, temporary barriers or parking placards are prime examples of infrastructure that would require such implementation. With no battery, this enables reliable simplex communication at less than $1 of additional cost over many years of practical life through all weather conditions.

All transponders are designed to beacon or modulate signals at a minimum of every 100 ms (10 times per second) with a range of 65 m (200'+) to ensure related location or alarming services can function effectively even when travelling at high speeds.

Each transponder is designed to store and relay a location triplet, a state code and a cryptographic key set (public and private).

In a preferred embodiment the system is configured to operate at short ranges so as to be useful and pertinent to a moving vehicle or monitoring, for example, a construction site. For example, the system installed on a vehicle would utilize at least two receptors, preferably four are installed on the vehicle to receive the relay signal from a beacon. The time of arrival of the signal at each receptor coupled with the strength of the signal allows the system, via algorithm, to compute the distance and location of the beacon from the vehicle. The system is continuously sending out the initial signal, thus is continuously receiving return signals allowing the system to also compute movement of the beacon (if the beacon is moving) in relation the system.

Components of the system to be able to function in a preferred embodiment include:
1. SEE ID RFID (Radio Frequency Identification) Roadway Markers (SRRM) with reflective lenses that have internal WORM (written once read many) RFID Tags programmed with Global Position:
   a. Passively or Actively read Information RFID Tags (WORM)
      i. Global Position measured from a known set source (ie surveyed marker for city, roadway or property)
         A. Information is also compared to a dual frequency GPS system for allowed updated accuracy
         B. Adhered to location by approved adhesive
            I. IF roadway to follow current MUTCD Manual on approved roadway adhesives for roadway markings
            II. IF historical location, approved adhesive for location.
      ii. Programmed information is encrypted information that only SEE ID reader modules with authorized verification can read, with communication from the SEE ID Database
      iii. Has protective shell that is installed over RFID tag that is water and weather tight iv. SRRM case has reflective identification tape on outside of case to allow for LIDAR system application usage by the SEE ID reader module.
b. Installed on roadway at set intervals.
i. The intervals are parallel according to lane
ii. offset to allow for triangulation of vehicle position
A. Offset will vary to allow for different lane identification and multiple lane differentiation
c. Each SRRM would have a unique identifier for location, series and production date that is programmed as installed in the roadway By the SRRM roadway installer.
d. Has reflective identifier that can used by LIDAR (Light Detection and Ranging) to determine the location of the SRRM 2. Vehicle mounted SEE ID scan and control system that includes:
a. Encrypted Programming to be able to read SRRMs
i. Ability to read Information in SRRM via RFID and secondary LIDAR sensors
ii. Have a verification process on first startup daily for use to allow access to data base of the SRRMs
iii. Process distance of SRRMs to vehicle while moving
iv. Share distance and location information with vehicle control systems
b. 4 optical scanner cameras used for measuring distance of vehicle while in motion to SRRM in three directions (LIDAR) (optional secondary).
i. Height of placement of the optical cameras will be as close to center of headlight for the vehicle that the SEE ID reader system is installed on
ii. The two of the forward placed LIDAR cameras will be installed as far forward of the vehicle as possible, with thought that the line of sight to roadway will not be inhibited.
A. The forward installed LIDAR cameras will also be equidistantly installed from each side of the front of the vehicle
iii. Two of the rear placed LIDAR cameras will be as close to the eight of the center of the brake lights of the vehicle that the SEE ID reader system is installed on, being as rear on the vehicle as possible, with thought that the line of sight to roadway will not be inhibited.
A. The rear installed LIDAR cameras will also be equidistantly installed from each side of the rear of the vehicle
iv. The wiring for the optical camera system will require a 5 volt positive wire supply, a ground wire, and 5 volt digital signal wire that communicates with the SEE ID reader module.
A. Ground and communication supply voltage power will be supplied by SEE ID reader control module.
B. 5 volt power supply to the LIDAR cameras will be provided by a fused power supply
c. 4 RFID reader sensors for sending and receiving SRRM information programmed with necessary information for triangulation of moving vehicle.
i. Height of placement of the SRRM RFID reader sensors will be as close to center of headlight for the vehicle that the SEE ID reader system is installed on.
ii. The two of the forward placed SRRM RFID reader sensors will be installed as far forward of the vehicle as possible, with thought that the line of sight to roadway will not be inhibited.
A. The forward installed SRRM RFID reader sensors will also be equidistantly installed from each side of the front of the vehicle
iii. Two of the rear placed SRRM RFID reader sensors will be as close to the eight of the center of the brake lights of the vehicle that the SEE ID reader system is installed on, being as rear on the vehicle as possible, with thought that the line of sight to roadway will not be inhibited.
A. The rear installed SRRM RFID reader sensors will also be equidistantly installed from each side of the rear of the vehicle
iv. The wiring for the SRRM RFID reader sensors system will require a 5 volt positive wire supply, a ground wire, and 5 volt digital signal wire that communicates with the SEE ID reader module.
A. Ground and communication supply voltage power will be supplied by SEE ID reader control module.
v. 5 volt power to the SRRM RFID reader sensors will be provided by a fused power supply
d. The SEE ID control module will gather information from SRRM sensors installed on vehicle, LIDAR cameras installed on vehicle and the vehicle Powertrain control module (PCM) in order to calculate:
i. Vehicle speed
ii. Vehicle distance from each SRRM to within 2 millimeters
iii. Vehicle global position read from SRRM, translated via the SRRM database
iv. Ability to send information to PCM for corrections needed to keep vehicle centered on roadway and in proper lane position.
e. Has communication system that communicates over wifi, 3G, 4G, LTE or yet to determined wireless network.
i. Ability to remote program system updates that would improve efficiency, communication and security of process
ii. Verification process that SEE ID reader module would be go/no-go access SEE ID database and SRRM information
f. Able to be read, programmed and diagnosed through OBD-II vehicle communications port. (Connector pin to be decided at later time)
g. Is programmed with vehicle size, center point of vehicle, distance of module from the 4 sensors, and special identifier for each module that is used.

3. SEE ID SRRM roadway installation system that needs the ability to:
a. Adhere SRRM to roadway with precise placement to within 0.5 of a millimeter
b. Measure distance from last SRRM installed
c. Determine offset for next lane of SRRMS for vehicle triangulation process
d. Measure distance from a fixed known point of reference
e. Read Global position of Installation Vehicle and verify accuracy from known location then program SRRM with needed information
f. Program SRRM as it is installed on location with the required encrypted unique identifier information 4. SEE ID Marker Database
a. Database is encrypted
b. Database has a listed longitude and latitude location of every installed SRRM and other proprietary security identifiers.
c. Access to the encryption of the information is licensed Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

What is claimed is:

1. A method of identifying the location of an object or person in relation to a reader, said method comprising:
   a) the step of providing a plurality of RFID beacons, wherein said plurality of RFID beacons comprise at least two independent beacons,
   b) the step of providing a reader, wherein said reader is configured to emit a primary signal wherein said reader is dynamically positioned in an environment, wherein said reader is configured to emit said signal while said reader is dynamically moving in said environment;
   c) the step of said reader emitting said primary signal from said reader, said primary signal configured to provide notification to said RFID beacons, wherein said beacons are configured to emit a secondary signal in response to said primary signal, wherein said secondary signal is configured to provide information about the identity of the beacon to said reader, wherein at least one of said beacons is dynamically positioned in said environment;
   d) the step of calculating the distance between said reader and said beacon;
   e) wherein said method is configured to be utilized at short range and long range;
   f) wherein said step of calculating distance between said reader and said beacon is repeated to dynamically calculate relative position between the reader and the beacon as each moves dynamically in said environment.

2. The method of claim 1, wherein said reader is mounted to a vehicle.

3. The method of claim 2, wherein said vehicle comprises multiple receptors for receiving a signal from a beacon.

4. The method of claim 1, wherein said reader is statically positioned.

5. The method of claim 1, wherein said reader is positioned in a construction zone, wherein said beacons are positioned on construction workers.

6. The method of claim 5, wherein said beacons are configured to emit a response to identify an acceptable area in which the beacon is allowed.

7. The method of claim 1, wherein said reader is positioned on a construction vehicle.

8. The method of claim 1, wherein said beacons comprise antennae positioned within a cellular telephone.

9. The method of claim 1, wherein said beacons are positioned in roadway modules, wherein said roadway modules are positioned in or on a roadway within or proximate to the edges of lanes of said roadway.

* * * * *